United States Patent [19]
Springer

[11] Patent Number: 5,936,608
[45] Date of Patent: Aug. 10, 1999

[54] COMPUTER SYSTEM INCLUDING DISPLAY CONTROL SYSTEM

[75] Inventor: David Springer, Austin, Tex.

[73] Assignee: Dell USA, LP, Round Rock, Tex.

[21] Appl. No.: 08/706,101

[22] Filed: Aug. 30, 1996

[51] Int. Cl.[6] .................................................. G09G 1/00
[52] U.S. Cl. ............................ 345/147; 345/74; 345/77; 315/169.3; 395/750.01; 395/750.03
[58] Field of Search ................................ 345/74, 75, 147, 345/211, 212, 213, 145, 343, 348; 315/169.3; 395/750.01, 750.03, 750.06, 750.07, 750.08

[56] References Cited

U.S. PATENT DOCUMENTS

| | | | |
|---|---|---|---|
| 5,283,500 | 2/1994 | Kochanski et al. ........................ | 315/58 |
| 5,371,844 | 12/1994 | Andrew et al. .......................... | 395/155 |
| 5,375,245 | 12/1994 | Solhjell et al. ........................ | 395/750 |
| 5,481,733 | 1/1996 | Douglis et al. ......................... | 395/750 |
| 5,499,038 | 3/1996 | DiSanto et al. ......................... | 345/107 |
| 5,499,325 | 3/1996 | Dugan, Jr. .............................. | 395/132 |
| 5,512,921 | 4/1996 | Mital et al. ............................. | 345/202 |
| 5,532,719 | 7/1996 | Kikinis ................................... | 395/155 |
| 5,565,897 | 10/1996 | Kikinis et al. ........................... | 345/213 |
| 5,576,738 | 11/1996 | Anwyl et al. ............................ | 345/212 |
| 5,696,978 | 12/1997 | Nishikawa .............................. | 395/750 |
| 5,748,927 | 5/1998 | Stein et al. .............................. | 345/348 |

*Primary Examiner*—Mark R. Powell
*Assistant Examiner*—Vincent E. Kovalick
*Attorney, Agent, or Firm*—Skjerven, Morrill, MacPherson, Franklin & Friel

[57] ABSTRACT

A computer system and methodology for controlling the brightness of visual objects displayed on an electron beam flat panel display monitor used in a computer system having a multitasking operating system and a graphics controller coupled to the display monitor. The display control system includes an operating rules module, an activity monitoring module, and a palette manager module. The operating rules module identifies one or more predetermined conditions of operating system events; which require a variation in the brightness of selected visual objects pertaining to the predetermined conditions. The activity monitoring module monitors and filters the operating system events for the predetermined conditions and transmits instructions to a palette manager module to vary the brightness of the selected visual objects when a predetermined condition has been met. The palette manager module varies the brightness of the selected visual objects using the graphics controller.

30 Claims, 3 Drawing Sheets

COMPUTER SYSTEM INCLUDING DISPLAY CONTROL SYSTEM

BACKGROUND OF THE INVENTION

1. Field of the Invention

This invention relates in general to computer systems and, more particularly to a display control system for personal computer systems.

2. Description of the Related Art

Personal computer systems in general and IBM compatible personal computer systems in particular have attained widespread use. These personal computing systems now provide computing power to many segments of today's modern society. A personal computer system can usually be defined as a desktop, floor-standing, or portable microcomputer that includes a system unit having a system processor with associated volatile and non-volatile memory, a display monitor, a keyboard, one or more floppy diskette drives, a hard disk storage device and an optional printer. One of the distinguishing characteristics of these systems is the use of a system board or mother board to electrically connect these components together. These personal computer systems are information handling systems which are designed primarily to give independent computing power to a single user and are inexpensively priced for purchase by individuals or small businesses.

Portable computers are often referred to as laptop, notebook or subnotebook computers. These computers typically incorporate a flat panel display, which is a relatively small video display with a shallow physical depth based on technology other than the cathode-ray tube (CRT), such as a liquid crystal display (LCD). Portable computers often provide for coupling to a conventional standalone display monitor. Many portable computers incorporate some strategy for automatically and incrementally dimming the entire flat panel display to conserve power. These are typically implemented via "activity timers" which start dimming the display when periods of inactivity on devices such as the mouse and keyboard exceed a preset threshold. However, these strategies are limited by current flat panel technology which can only dim or brighten the entire display surface at once which renders the display monitor more difficult to view as more power is saved. Most flat panels utilize a single "backlight" to control panel brightness. Power consumption of laptop displays is directly related to the brightness of the "backlight" bulb, therefore, the entire display screen must be dimmed in order to reduce power consumption. Maintaining a high level of brightness on the display monitor is one of the most significant factors detrimentally effecting battery life. It is also one of the most problematic to address with typical flat panel display technology.

A new display technology, compatible for use with portable computers, is the electron beam flat panel display technology. An electron beam flat panel display monitor 80, illustrated in FIG. 1, utilizes large arrays of individually controllable cold-cathode field emission devices 85 (electron guns) in conjunction with a transparent phosphor-coated plate 90 and a conventional CRT mechanism. The volume of space between the baseplate 95, which holds the emission devices 85, and the phosphor-coated plate 90 is evacuated. When the emission device 85 is activated, electrons are accelerated from the cold-cathode field emission devices 85 towards the phosphor-coated plate 90, which serves as an anode and has a positive voltage relative to the emission devices 85. The phosphor on the phosphor-coated plate 90 is induced into cathodoluminescence by the bombarding electrons arriving at the phosphor surface via the same mechanism observed in conventional CRT technology and serves as the light source seen by a viewer. The electron beam flat panel display monitor 80 illuminates individual pixels, which are the bits which define the color and brightness of the picture or text elements. Therefore the power consumption of any one gun is proportional to the brightness of the pixel it is illuminating.

The operating system of a personal computer supplies certain functions that make up the interface between the application programs, the hard drives and the data on the volume (file system). Thus, the program (or computer system user) doesn't need to locate the individual data on the volume, or read one or more records into memory. Instead, the operating system returns all the requested data to the application (and therefore to the user) after a system call or command. Moreover, the operating system allows input and output of data through the parallel and series interfaces, and displays text and graphics on the display monitor. It manages main memory and allocates part of it to application programs. Therefore, the operating system controls and supervises the operation of the whole computer. An operating system which can manage several tasks in a computer system simultaneously, activating a task for a short time period and interrupting the task again later, is a multitasking operating system such as OS/2, UNIX or a Windows® based operating system. UNIX is a multitasking operating system for simultaneously serving several workstations. OS/2 is the multitasking successor to DOS (Disk Operating System) for IBM-compatible personal computers. Microsoft Windows® is a multitasking graphical user interface (GUI) environment that runs on Microsoft/MS-DOS-based computers.

The GUI is a type of display format that enables the computer system user to chose commands, start programs, and see lists of files and other options by pointing to pictorial representations (icons) and lists of menu items on the screen. Choices can generally be activated either with the keyboard or with a mouse. GUIs are used on the various multitasking operating systems. For example, Windows® based operating systems have an open programming interface which allows an invisible background task to track which GUI object currently has the user focus.

Most "windows" oriented operating systems reduce and increase the vibrancy of individual window borders in order to highlight which control or application area the computer system user is currently focused on. Typically, only application borders, captions and icons are utilized while ignoring large viewable display components such as application client windows and background wallpaper. This is done for information management purposes rather than power management.

An important design consideration for portable computers is power consumption. It is desirable to design portable computers to consume very little power during operation, thereby extending the duration of computer usage between battery charges. Visual display devices or monitors represent a significant portion of the power consumption for the entire portable computer. Therefore, there is a need to design a computer system which reduces the power consumption of visual display monitors.

SUMMARY OF THE INVENTION

The present invention provides a personal computer system which has a display control system wherein the average power consumption of the display monitor is substantially reduced. More particularly, a computer system is disclosed which includes a processor, a memory, a multitasking operating system, a graphics controller and an electron beam flat panel display monitor coupled to the graphics controller. The computer system includes an operating rules module which identifies one or more predetermined conditions of operating system events which require a variation in the brightness of selected visual objects displayed on the display monitor and pertaining to the predetermined condition. An activity monitoring module monitors and filters the operating system events for the predetermined conditions. The activity monitoring module transmits instructions to a palette manager module to vary the brightness of the selected visual objects. The palette manager module manages the variation of brightness of the selected visual objects using the graphics controller.

The palette manager module manages the variation of brightness by managing multiple sets of system colors using a video palette DAC in the graphics controller, including at least one set each of normal system colors and reduced brightness system colors. The palette manager module transmits messages to the selected visual objects to use either normal system colors or reduced brightness system colors, and accomplishes the system colors variation of the selected visual objects by varying, in increments, the brightness of individual pixels on the electron beam flat panel display monitor. For example, the predetermined conditions identified by the operating rules module includes a change in a computer system user's focus from one visual object to another and the palette manager module reduces the brightness of those visual objects toot in the computer system user's focus, whereby the power consumed by the display monitor is reduced. The visual objects include such items as window types in a "windows" based multitasking operating system. Therefore, in another example, the predetermined conditions identified by the operating rules module include a change in a computer system user's focus from one window type to another window type and the palette manager module reduces the brightness of those windows not in the computer system user's focus. Another advantage of the display control system of the present invention is in directing a computer system user's focus to the relevant tasks on a screen displaying multiple tasks to facilitate ease of use.

A computer system is thus provided which facilitates ease of use and effectively reduces the average power consumed in a personal computer system having a multitasking operating system and using an electron beam flat panel display monitor by reducing the brightness of individual pixels and/or groups of pixels corresponding to visual objects selected by the display control system of the present invention.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION OF THE PREFERRED EMBODIMENTS

The following sets forth a detailed description of the best contemplated mode for carrying out the invention. The description is intended to be illustrative of the invention and should not be taken to be limiting.

Figure 1:
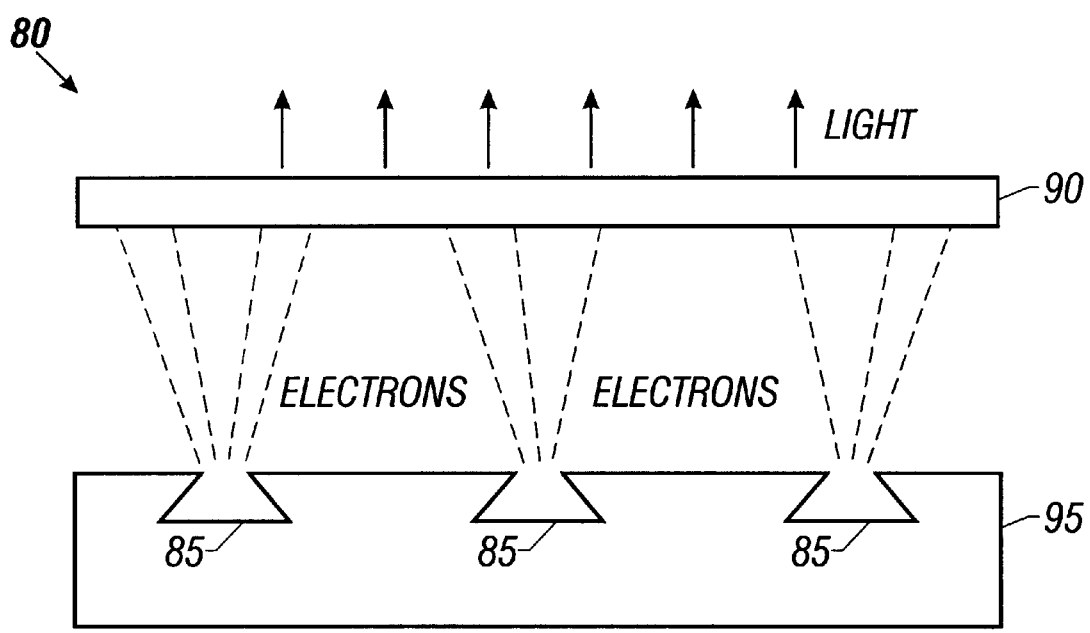
FIG. 1, as noted above and labeled prior art, illustrates a cross-sectional view of a portion of an electron beam flat panel display monitor.
Figure 2:
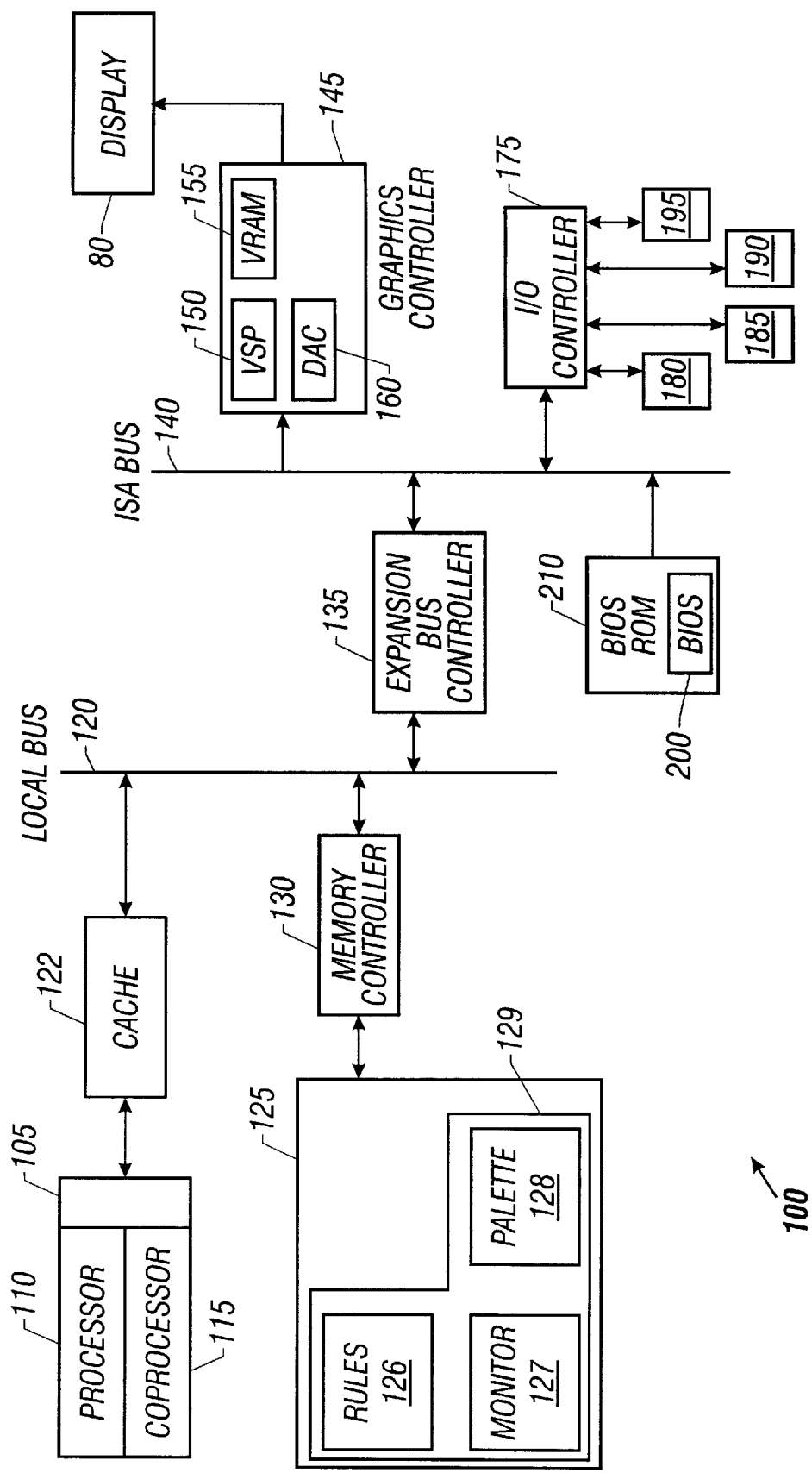
FIG. 2 shows a block diagram of the disclosed computer system which includes a multitasking operating system and an electron beam flat panel display monitor.

As discussed above, FIG. 1 illustrates a cross section view of an electron beam flat panel display monitor 80 as used in conjunction with the present invention. FIG. 2 shows a block diagram of the disclosed computer system 100 including an electron beam flat panel display monitor 80 and a multitasking operating system. The computer system 100 has a main memory 125 and memory controller 130 and employs the display control system of the present invention stored within main memory 125. The display control system includes an operating rules module which identifies one or more predetermined conditions of operating system events or messages which require a variation in the brightness of visual objects displayed on the electron beam flat panel display monitor 80. The operating system events are monitored and filtered for the predetermined conditions by an activity monitoring module and in the event that a predetermined condition is found to exist, the activity monitoring module transmits instructions to a palette manager module to vary the brightness of selected visual objects pertaining to the predetermined conditions. The palette manager module then directs the variation of brightness of the selected visual objects using a graphics controller 145 of the computer system 100. The operating rules module, activity monitoring module and the palette manager module will be discussed later in more detail. The terms module and routine are used interchangeably in this document.

The computer system 100 which includes a multitasking operating system is now to be described. Computer system 100 includes a microprocessor 105 having processor 110 and a coprocessor 115 coupled to local bus 120. Processor 110 is preferably a microprocessor such as an Intel Pentium® microprocessor. Local bus 120 includes conventional data, address and control lines conforming to, for example, the peripheral connect interface (PCI) architecture. Main system memory 125 of dynamic random access memory (DRAM) modules is coupled to local bus 120 by a memory controller 130. Main memory 125 stores application programs and data for execution boy processor 110 and coprocessor 115. The display control system 129 routines of the present invention, the operating rules module (RULES) 126, the activity monitoring module (MONITOR) 127 and the palette manager module (PALETTE) 128, are preferably stored within main memory 125.

Basic Input/Output System (BIOS) software 200 is stored in nonvolatile memory BIOS ROM 210. BIOS 200 is a microcode software interface between an operating system or application programs and the hardware of computer system 100. The operating system and application programs access BIOS 200 rather than directly manipulating I/O ports and control words of the specific hardware. BIO 200 is accessed through an interface of software interrupts and contains a plurality of entry points corresponding to the different interrupts. In operation, BIOS 200 is loaded from BIOS ROM 210 to system memory 125 and is executed from system memory 125. The display control system 129 may also be stored in non-volatile memory such as BIOS 200.

A bus interface controller or expansion bus controller 135 couples local bus 120 to an expansion bus 140. Expansion bus 140 is an industry standard architecture (ISA) bus or other bus architecture if desired. The graphics controller 145 is coupled to expansion bus 140 and includes a video signal processor (VSP) 150, a video random access memory (VRAM) 155 and a video palette digital to analog converter (DAC) 160. VSP 150 is coupled to VRAM 155 and to video palette DAC 160. The graphics controller 145 couples an electron beam flat panel display monitor 80 to expansion bus 140 to permit display of graphics images or visual objects to the computer system user. Expansion bus 140 is further coupled to I/O controller 175 which is coupled to and controls the operation of hard drive 180, floppy drive 185, keyboard 190 and mouse 195. Printers and other output devices can also be coupled to I/O controller 175.

Figure 3:
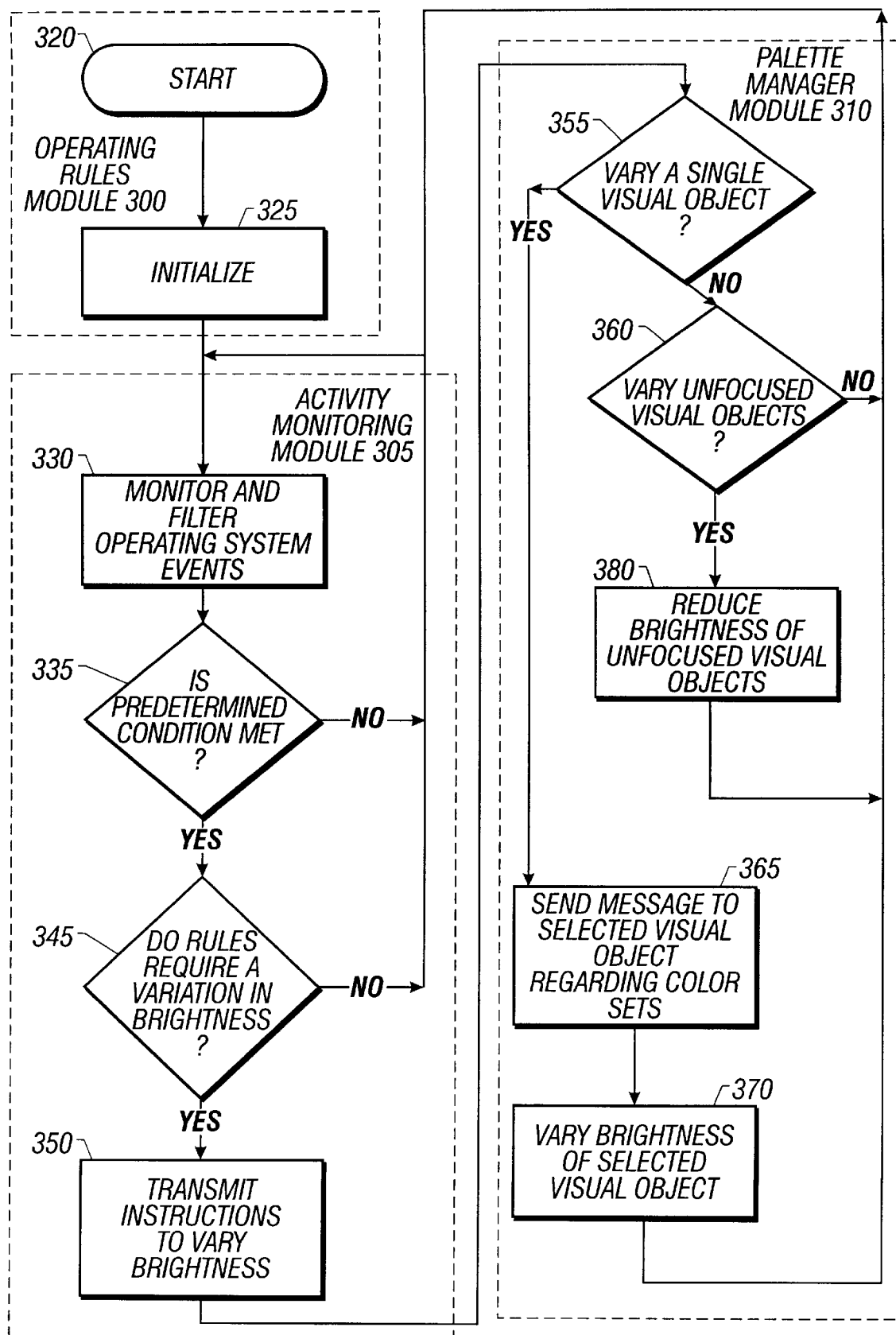
FIG. 3 shows a flowchart of a display control sequence in accordance with the present invention.

FIG. 3 is a flow chart which illustrates the operation of the operating rules module 300, the activity monitoring module 305 and the palette manager module 310. After computer system 100 is initialized, process flow starts at start block 320 of operating rules module 300. As per block 325, the operating rules module 300 initializes parameters and operating characteristics for the display control system. Parameters are defined by identifying one or more predetermined conditions of operating system events or messages which require a variation in the brightness of selected visual objects pertaining to the predetermined conditions. A visual object displayed on the electron beam flat panel display monitor 80 is, for example, a window or an icon or a group of windows or icons. The multitasking operating system has an open programming interface which allows a background task to track which graphical user interface (GUI) object or "window" has the computer system user's focus and other similar events indicating activity by the computer system user. Therefore, the predetermined conditions of operating system events which may be identified by the operating rules module 300 as requiring a variation in the brightness of the selected visual objects include; visual objects not in the computer system user's focus; a visual object with drawing activity indicating that the visual object has come into the computer system user's focus. A visual object no longer in the computer system user's focus would require dimming with some possible exceptions, and a visual object with drawing activity which indicates that the visual object has come into the computer system user's focus would be brightened. Other predetermined conditions that may be initialized by the operating rules module 300 include; maintaining certain application icons bright at all times, keeping the cursor bright at all times, and dimming selected background windows.

The operating rules module 300 also identifies a length of time a predetermined condition must exist (i.e. an event timer) before varying the brightness of the selected visual object and the magnitude of variation in the brightness of the selected visual object for each predetermined condition. The magnitude of variation of brightness may be any level of luminescence or color brightness. Therefore, the display control system would allow various levels of brightness magnitude for various visual objects at the same time on the electron beam flat panel display monitor 80. The operating characteristics can be modified by the computer system user or modified automatically by heuristic algorithms. The operating rules module 300 can, of course, include numerous parameters and operating characteristics not specifically identified herein.

The activity monitoring module 305 monitors and filters the operating system events or messages as per block 330 for those events identified by the operating rules module 300. A test is then conducted at decision block 335 to find out if a predetermined condition identified by the operating rules module 300 ha:, occurred. For example, the activity monitoring module 305 tests to see if the length of time prescribed by the operating rules module 300 has been met for a particular operating system event (for instance, the length of time a window is out of the computer system user's focus). The activity monitoring module 305 also tests for numerous other conditions as identified by the operating rules module 300. If a predetermined condition did not occur, then testing for a predetermined condition continues. However, for discussion purposes it is assumed that a predetermined condition has occurred.

Once a condition has been met, the activity monitoring module 315 queries the operating rules module 300, as per block 345, regarding whether or not the particular condition for the operating system event requires a variation in color brightness and, if so, what magnitude of variation. For example, if a particular visual object, such as a "window" is indicated by an operating system message as no longer in the, computer system user's focus for some set length of time, then the operating rules module 300 would specify that the color brightness of the "window" be dimmed. In another example, if the operating system event or message indicates that a drawing activity (a predetermined condition which indicates that the "window" is within the computer system user's focus) has occurred in a particular "window", then the operating rules module 300 would specify that the color brightness of the "window" be brightened. If a variation in the brightness of a visual object is not required then the activity monitoring module 305 returns to the step of monitoring and filtering operating system events. However, for discussion purposes it is assumed that a brightness variation is required.

The activity monitoring module 305 then transmits instructions to the palette manager module 310 regarding variation in the brightness of the selected visual object. The instructions include, for example, the visual object or objects to be varied, the magnitude of variation of color brightness (either increased or decreased) and a time frame for variation.

The palette manager module 310 receives instructions for variation and manages the variation of brightness of the selected visual objects using the graphics controller 145. The palette manager module manages multiple sets of system colors using the video palette DAC 160, in the graphics controller 145, including at least one set each of normal system colors and reduced brightness system colors, and transmits messages to the selected visual objects to use either normal system colors or reduced brightness system colors. The palette manager module 310 accomplishes the system colors variation of the selected visual objects by varying, in increments, the brightness of individual pixels on the electron beam flat panel display monitor 80.

Accordingly, in the illustrated flowchart, a test is conducted by the palette manager module 310 at decision block 355 and decision block 360 to determine if only a single visual object requires a variation in brightness (decision block 355) or whether all unfocused visual objects (i.e. "windows", icons, etc.) should be dimmed (decision block 360). If the brightness of only a single visual object is to be varied, the palette manager module 310 transmits a message to the selected visual object on the electron beam flat panel display monitor 80 to use either normal system colors or reduced brightness system colors as per block 365. A "paint" message is then sent to the selected visual object to realize the changed color set and the color brightness is varied incrementally, as per block 370, by varying the brightness of individual pixels on the electron beam flat panel display monitor 80. If, however, the instructions sent to the palette manager module 310 from the activity monitoring module 305 indicate that all unfocused visual objects are to be dimmed, then, as per block 380, the color brightness of all unfocused visual objects is reduced incrementally. There may be some exceptions to dimming unfocused visual objects previously identified by the operating rules module 300 such as keeping all icons bright. Again, the palette manager module 310 transmits a message to all selected visual objects on the electron beam flat panel display monitor 80 to use reduced brightness system colors and a "paint" message is then sent to realize the changed color sets and the color brightness is reduced incrementally by reducing the brightness of individual pixels on the electron beam flat panel display monitor 80.

The foregoing has described a computer apparatus and methodology which provides a display control capability for a computer system having a multitasking operating system and an electron beam flat panel display monitor. This display control system has the advantage of significantly extending battery life in battery powered personal computers through the unobtrusive and automatic dimming of the unfocused portions and/or windows of the display. The display control system also has an advantage in that various windows or selected visual objects may be dimmed at various magnitudes for various times for ease of use by a computer system user. The method of the present invention also has an advantage in that it can be installed at any time, even in the field by an end user, on any computer system having an electron beam flat panel display monitor and a supporting multitasking operating system.

Other embodiments are within the following claims and while only certain preferred features of the invention have been shown by way of illustration, many modifications and changes will occur. For example, the various conditions and events may be modified to maximize ease of use or to minimize power consumption. Also for example, while the preferred embodiment is set forth as software, it is anticipated that the invention could be implemented in hardware such as an application specific integrated circuit. It is, therefore, to be understood that the present claims are intended to cover all such modifications and changes which fall within the true spirit of the invention.

What is claimed is:

1. A computer system comprising:

a processor;

a memory coupled to the processor;

a multitasking operating system stored in the memory, the multitasking operating system tracking operating system events;

a graphics controller coupled to the processor;

a display for which power consumption can be controlled pixel by pixel, the display coupled to said graphics controller, the display monitor displaying visual objects;

an operating rules module for identifying one or more predetermined conditions of operating system events which require a variation in the brightness of a visual object selected from among a plurality of visual objects based on said predetermined conditions;

an activity monitoring module for monitoring and filtering operating system events for said predetermined conditions and for transmitting instructions to vary the brightness of the selected visual objects; and a palette manager module for receiving instructions from the activity monitoring module and for managing the variation of brightness of the selected visual objects using the graphics controller.

2. The computer system of claim 1 wherein the palette manager module manages multiple sets of system colors including at least one set each of normal system colors and reduced brightness system colors, and transmits messages to the selected visual objects to use either normal system colors or reduced brightness system colors, and accomplishes the system colors variation of the selected visual objects by varying, in increments, the brightness of individual pixels on the display monitor.

3. The computer system of claim 2 wherein the graphics controller has a video palette digital to analog converter (DAC) and the palette manager module manages the sets of system colors through the video palette DAC.

4. The computer system of claim 1 wherein the predetermined conditions are automatically modified using heuristic algorithms.

5. The computer system of claim 1 wherein the predetermined conditions are modified by a computer system user.

6. The computer system of claim 1 wherein the operating rules module further identifies a length of time said predetermined condition must exist before varying the selected visual objects on the display monitor.

7. The computer system of claim 1 wherein the operating rules module further identifies a magnitude of variation in the brightness of the selected visual objects on the display monitor for each predetermined condition.

8. The computer system of claim 1 wherein said predetermined conditions include a change in a computer system user's focus from one visual object to another visual object on the display monitor and wherein the palette manager module reduces the brightness of those selected visual objects not in the computer system user's focus using the graphics controller, whereby the power consumed by the display monitor is reduced.

9. The computer system of claim 1 wherein the multitasking operating system is a windows based multitasking operating system and wherein the selected visual objects are window types.

10. The computer system of claim 9 wherein said predetermined conditions include a change in the computer system user's focus from one window type to another window type and wherein the palette manager module reduces the brightness of those windows not in the computer system user's focus using the graphics controller, whereby the power consumed by the display monitor is reduced.

11. A method for controlling brightness of visual objects displayed on a display for which power consumption can be controlled pixel by pixel the display monitor used in a system having at multitasking operating system and a graphics controller coupled to the display monitor, the method comprising the steps of:

identifying one or more predetermined conditions of operating system events which require a variation in the brightness of a visual object selected from among a plurality of visual objects based on said predetermined conditions;

monitoring the operating system events;

filtering the operating system events for the predetermined conditions; and varying the brightness of the selected visual objects using the graphics controller.

12. The method of claim 11 wherein the varying, step comprises:

managing multiple sets of system colors including at least one set each of normal system colors and reduced brightness system colors;

transmitting messages to the selected visual objects to use either normal system colors or reduced brightness system colors; and accomplishing the system color variation of the selected visual objects by varying, incrementally, the brightness of individual pixels on the, display monitor.

13. The method of claim 12 further comprising varying the brightness of groups of pixels on the display monitor wherein either normal system colors or reduced brightness system colors are displayed.

14. The method of claim 11 further comprising the step of automatically modifying the predetermined conditions using heuristic algorithms.

15. The method of claim 11 further comprising the step of modifying the predetermined conditions by a computer system user.

16. The method of claim 11 wherein the step of identifying one or more predetermined conditions is further defined by determining a length of time said predetermined condition must exist before varying the selected visual objects on the display monitor.

17. The method of claim 11 wherein the step of identifying one, or more predetermined conditions is further defined by determining a magnitude of variation in the brightness of visual objects on the display monitor for each predetermined condition.

18. The method of claim 11 wherein said predetermined conditions include a change in a computer system user's focus from one visual object to another visual object and wherein the palette manager module reduces the brightness of those selected visual objects not in the computer system user's focus, whereby the power consumed by the display monitor is reduced.

19. The method of claim 11 wherein the multitasking operating system is a windows based multitasking operating system and wherein the selected visual objects are window types.

20. The method of claim 19 wherein said predetermined conditions include a change in the computer system user's focus from one window type to another window type and wherein the palette manager module reduces the brightness of those windows not in the computer system user's focus using the graphics controller, whereby the power consumed by the display monitor is reduced.

21. An apparatus comprising:
   a non-volatile memory;
   an operating rules means, stored in non-volatile memory, for identifying one or more predetermined conditions of operating system events which require a variation in the brightness of a visual object selected from among a plurality of visual objects based on said predetermined conditions;
   an activity monitoring means, stored in non-volatile memory, for monitoring and filtering the operating system events for the predetermined conditions; and
   a palette manager means, stored in non-volatile memory, for varying the brightness of the selected visual objects using the graphics controller.

22. The apparatus of claim 21 wherein said palette manager means includes:
   means for managing multiple sets of system colors including at least one set each of normal system colors and reduced brightness system colors;
   means for transmitting messages to the selected visual objects to use either normal system colors or reduced brightness system colors; and
   means for accomplishing the system color variation of the selected visual objects by varying, incrementally, the brightness of individual pixels on a display for which power consumption can be controlled pixel by pixel.

23. The apparatus of claim 22 further including a means for varying the brightness of groups of pixels on the display monitor wherein either normal system colors or reduced brightness system colors are displayed.

24. The apparatus of claim 21 further including a means for automatically modifying the predetermined conditions using heuristic algorithms.

25. The apparatus of claim 21 further including a means for modifying the predetermined conditions by a computer system user.

26. The apparatus of claim 21 wherein the operating rules means further includes determining a length of time said predetermined condition must exist before varying the selected visual objects on the display monitor.

27. The apparatus of claim 21 wherein the operating rules means further includes determining a magnitude of variation in the brightness of visual objects on the display monitor for each predetermined condition.

28. The apparatus of claim 21 wherein said predetermined conditions include a change in a computer system user's focus from one visual object to another visual object and wherein said palette manager means further includes reducing the brightness of those selected visual objects not in the computer system user's focus, whereby the power consumed by the display monitor is reduced.

29. The apparatus of claim 21 wherein the multitasking operating system is a windows based multitasking operating system and wherein the selected visual objects are window types.

30. The apparatus of claim 29 wherein said predetermined conditions include a change in the computer system user's focus from one window type to another window type and wherein said palette manager means further includes reducing the brightness of those windows not in the computer system user's focus using the graphics controller, whereby the power consumed by the display monitor is reduced.

* * * * *